US011942262B2

(12) United States Patent
Miyake et al.

(10) Patent No.: US 11,942,262 B2
(45) Date of Patent: Mar. 26, 2024

(54) INDUCTOR COMPONENT

(71) Applicant: Murata Manufacturing Co., Ltd., Kyoto-fu (JP)

(72) Inventors: Isamu Miyake, Nagaokakyo (JP); Yoshimasa Yoshioka, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 543 days.

(21) Appl. No.: 17/191,406

(22) Filed: Mar. 3, 2021

(65) Prior Publication Data

US 2021/0280360 A1 Sep. 9, 2021

(30) Foreign Application Priority Data

Mar. 5, 2020 (JP) ................................ 2020-037788

(51) Int. Cl.

| | |
|---|---|
| ***H01F 27/28*** | (2006.01) |
| ***H01F 27/255*** | (2006.01) |
| ***H01F 27/29*** | (2006.01) |
| ***H01F 41/02*** | (2006.01) |

(52) U.S. Cl.

CPC ....... *H01F 27/2828* (2013.01); *H01F 27/255* (2013.01); *H01F 27/29* (2013.01); *H01F 41/0246* (2013.01)

(58) Field of Classification Search

CPC .... H01F 27/2828; H01F 27/255; H01F 27/29; H01F 41/0246; H01F 2017/048; H01F 17/04; H01F 27/292; H01F 17/0006; H01F 17/0013; H01F 27/2804; H01F 41/041; H01F 2017/002; H01F 2017/0093; H01F 2027/2809

USPC ........................................ 336/192, 198, 221

See application file for complete search history.

(56) References Cited

U.S. PATENT DOCUMENTS

| | | | | |
|---|---|---|---|---|
| 2019/0115143 | A1* | 4/2019 | Tachibana | H01F 27/292 |
| 2019/0198225 | A1* | 6/2019 | Miyoshi | H01F 27/292 |

FOREIGN PATENT DOCUMENTS

| | | | |
|---|---|---|---|
| CN | 109671558 | A | 4/2019 |
| CN | 109950027 | A | 6/2019 |
| JP | H11-288831 | A | 10/1999 |
| JP | 2001-196226 | A | 7/2001 |
| JP | 2015-106583 | A | 6/2015 |
| JP | 2019-075447 | A | 5/2019 |
| JP | 2019-114606 | A | 7/2019 |

* cited by examiner

*Primary Examiner* — Shawki S Ismail
*Assistant Examiner* — Kazi S Hossain
(74) *Attorney, Agent, or Firm* — Studebaker & Brackett PC

(57) ABSTRACT

In an inductor component, an inductor wire is in an element body and extends on a virtual flat plane passing inside the element body. A wire main body of the inductor wire has an oblong rectangular shape elongated in a length direction in the top view, and thus, a wire width perpendicular to the extending direction is constant. From each edge of the wire main body in a width direction, protrusions having an oblong rectangular shape in the top view protrude and extend, from a center of the wire main body in the extending direction of the wire main body, in a direction perpendicular to the extending direction, on both sides in the width direction of the wire main body, with the extending direction sandwiched between the protrusions. An area ratio of a protrusion area of the protrusions to an area of the wire main body is within 7.2%.

19 Claims, 8 Drawing Sheets

FIG. 12

| | Protrusion width PW (μm) | Protrusion length PL (μm) | Protrusion width ratio (%) | Protrusion length ratio (%) | Protrusion area PA (μm²) | Area ratio (%) | Inductance ratio (%) | Existence or non-existence of positional displacement of wire |
|---|---|---|---|---|---|---|---|---|
| Comparative example | 0 | 0 | 0 | 0 | 0 | 0.0 | 100 | NG |
| Example 1 | 5 | 20 | 10 | 4 | 100 | 0.4 | 100 | G |
| Example 2 | 5 | 40 | 10 | 8 | 400 | 0.8 | 99 | G |
| Example 3 | 5 | 60 | 10 | 12 | 600 | 1.2 | 99 | E |
| Example 4 | 5 | 80 | 10 | 16 | 800 | 1.6 | 99 | E |
| Example 5 | 5 | 100 | 10 | 20 | 1000 | 2.0 | 99 | E |
| Example 6 | 10 | 20 | 20 | 4 | 400 | 0.8 | 99 | G |
| Example 7 | 10 | 40 | 20 | 8 | 800 | 1.6 | 100 | E |
| Example 8 | 10 | 60 | 20 | 12 | 1200 | 2.4 | 99 | E |
| Example 9 | 10 | 80 | 20 | 16 | 1600 | 3.2 | 98 | E |
| Example 10 | 10 | 100 | 20 | 20 | 2000 | 4.0 | 98 | E |
| Example 11 | 15 | 20 | 30 | 4 | 600 | 1.2 | 99 | E |
| Example 12 | 15 | 40 | 30 | 8 | 1200 | 2.4 | 99 | E |
| Example 13 | 15 | 60 | 30 | 12 | 1800 | 3.6 | 99 | E |
| Example 14 | 15 | 80 | 30 | 16 | 2400 | 4.8 | 99 | E |
| Example 15 | 15 | 100 | 30 | 20 | 3000 | 6.0 | 97 | E |
| Example 16 | 20 | 20 | 40 | 4 | 800 | 1.6 | 99 | E |
| Example 17 | 20 | 40 | 40 | 8 | 1600 | 3.2 | 98 | E |
| Example 18 | 20 | 60 | 40 | 12 | 2400 | 4.8 | 98 | E |
| Example 19 | 20 | 80 | 40 | 16 | 3200 | 6.4 | 98 | E |
| Example 20 | 25 | 20 | 50 | 4 | 1000 | 2.0 | 99 | E |
| Example 21 | 25 | 40 | 50 | 8 | 2000 | 4.0 | 98 | E |
| Example 22 | 25 | 60 | 50 | 12 | 3000 | 6.0 | 98 | E |
| Example 23 | 30 | 20 | 60 | 4 | 1200 | 2.4 | 99 | E |
| Example 24 | 30 | 40 | 60 | 8 | 2400 | 4.8 | 98 | E |
| Example 25 | 30 | 60 | 60 | 12 | 3600 | 7.2 | 97 | E |
| Example 26 | 35 | 20 | 70 | 4 | 1400 | 2.8 | 99 | E |
| Example 27 | 35 | 40 | 70 | 8 | 2800 | 5.6 | 98 | E |
| Referential example 28 | 25 | 80 | 50 | 16 | 4000 | 8.0 | 97 | E |
| Referential example 29 | 35 | 60 | 70 | 12 | 4200 | 8.4 | 97 | E |
| Referential example 30 | 20 | 100 | 40 | 20 | 4000 | 8.0 | 96 | E |
| Referential example 31 | 25 | 100 | 50 | 20 | 5000 | 10.0 | 96 | E |
| Referential example 32 | 30 | 80 | 60 | 16 | 4800 | 9.6 | 96 | E |
| Referential example 33 | 30 | 100 | 60 | 20 | 6000 | 12.0 | 95 | E |
| Referential example 34 | 35 | 80 | 70 | 16 | 5600 | 11.2 | 96 | E |
| Referential example 35 | 35 | 100 | 70 | 20 | 7000 | 14.0 | 95 | E |

INDUCTOR COMPONENT

CROSS-REFERENCE TO RELATED APPLICATION

This application claims benefit of priority to Japanese Patent Application No. 2020-037788, filed Mar. 5, 2020, the entire content of which is incorporated herein by reference.

BACKGROUND

Technical Field

The present disclosure relates to an inductor component.

Background Art

In the inductor component described in Japanese Patent Application Laid-Open No. 2001-196226, an inductor wire is disposed to be sandwiched between a pair of flat plate-shaped magnetic members. The inductor wire includes a wire main body extending in a circular arc-shape. Three terminal parts extend from the wire main body.

SUMMARY

With regard to an inductor component as described in Japanese Patent Application Laid-Open No. 2001-196226, a part of a wire main body of an inductor wire is sometimes displaced from a designed position, so that the wire main body is disposed to be tortuous or inclined with respect to a designed extending direction. Such a partial positional displacement of the wire main body can be a cause of inductance error of the inductor component, and is therefore not preferable.

Accordingly, an inductor component of an aspect of the present disclosure includes an element body containing a magnetic material; and an inductor wire disposed in the element body. The inductor wire includes a wire main body extending on a predetermined plane; a pad via which the wire main body is to be connected to another wire; and a protrusion protruding, from the wire main body, on the predetermined plane. The wire main body is parallel to the predetermined plane and has a dimension that is constant in a width direction perpendicular to an extending direction in which the wire main body extends, the protrusion protrudes from an edge, of the wire main body, in the width direction, and an area ratio of the protrusion to the wire main body as viewed from a direction perpendicular to the predetermined plane is less than or equal to 7.2%.

With the above configuration, since the protrusion is provided, a contact area, on the predetermined plane, between the inductor wire and the element body is accordingly larger. Therefore, the inductor wire can be strongly in close contact with another part, so that it is possible to prevent or reduce displacement of the wire main body of the inductor wire from a designed position in the width direction. Further, since the area ratio of the protrusion to the wire main body is less than or equal to 7.2%, it is possible to prevent or reduce the protrusion being excessively large with respect to the wire main body, and it is possible to prevent or reduce a decrease in inductance of the inductor component.

Also, an inductor component of an aspect of the present disclosure includes an element body containing a magnetic material; and an inductor wire disposed in the element body. The inductor wire includes a wire main body extending on a predetermined plane; a pad via which the wire main body is to be connected to another wire; and a protrusion protruding, from the wire main body, on the predetermined plane. The wire main body is parallel to the predetermined plane and has a dimension that is constant in a width direction perpendicular to an extending direction in which the wire main body extends, the protrusion protrudes from an edge, of the wire main body, in the width direction, and an area of the protrusion to the wire main body as viewed from a direction perpendicular to the predetermined plane is less than or equal to 3,600 square micrometers.

With the above configuration, since the protrusion is provided, a contact area, on the predetermined plane, between the inductor wire and the element body is accordingly larger. Therefore, the inductor wire can be strongly in close contact with another part, so that it is possible to prevent or reduce displacement of the wire main body of the inductor wire from a designed position in the width direction. Further, since the area of the protrusion is less than or equal to 3,600 square micrometers, it is possible to prevent or reduce the protrusion being excessively large with respect to the wire main body, and it is possible to prevent or reduce a decrease in inductance of the inductor component.

Positional displacement of the wire main body of the inductor wire is prevented or reduced.

BRIEF DESCRIPTION OF THE DRAWINGS

FIG. 12 is a table showing comparison results among an inductor component of a comparative example, inductor components of examples, and inductor components of referential examples;

DETAILED DESCRIPTION

In the following, an embodiment of an inductor component will be described. Note that the drawings show enlarged views of components in some cases for easy understanding. Dimensional ratios of components are sometimes different from actual dimensional ratios or dimensional ratios in other drawings.

Figure 1:
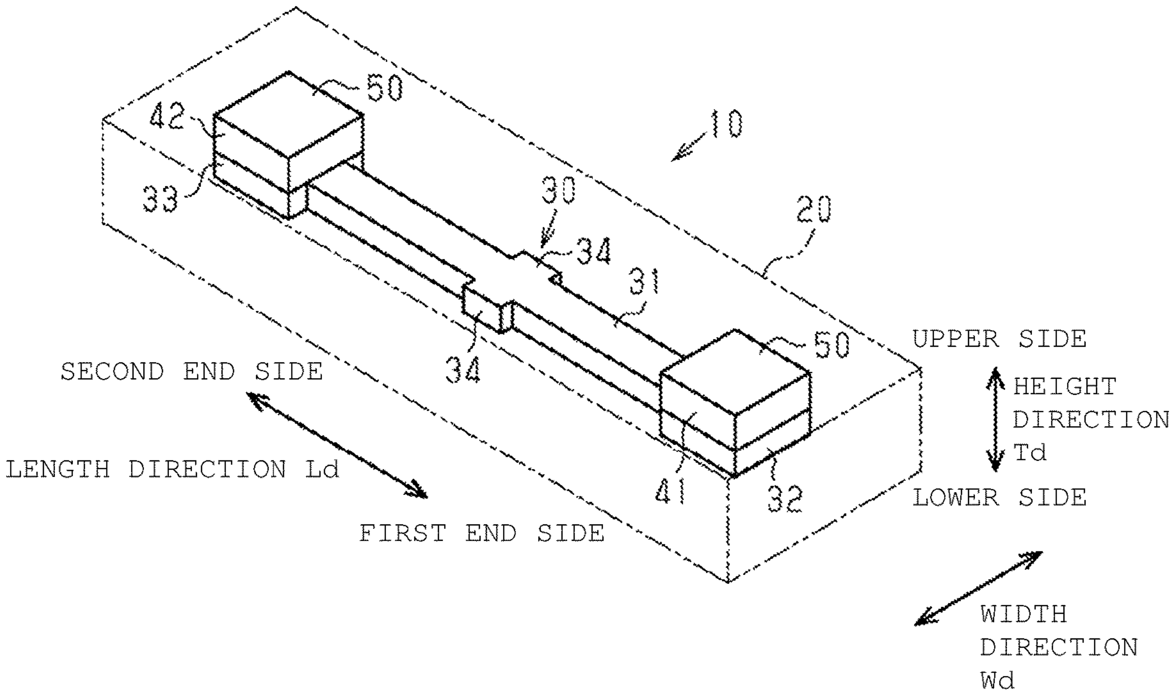
FIG. 1 is a perspective view of an inductor component.

As shown in FIG. 1, an inductor component 10 includes an element body 20 configured of a magnetic material. The element body 20 has an outer appearance of a flat quadrangular prism. A material of the element body 20 is resin containing a metal magnetic powder such as iron and works as a magnetic material having magnetism as a whole. Note that, in the following description, a center axial line-direction of the element body 20 is assumed as a length direction Ld. In addition, a height direction Td and a width direction Wd that are perpendicular to the length direction Ld are defined as follows. Specifically, the height direction Td is the direction that is one of directions perpendicular to the length direction Ld and is perpendicular to the main face of a circuit board when the inductor component 10 is assembled on the circuit board. The width direction Wd is the direction that is one of directions perpendicular to the length direction Ld and is parallel to the main face of a circuit board when the inductor component 10 is assembled on the circuit board. In the present embodiment, the element body 20 has a larger dimension in the width direction Wd than in the height direction Td.

Figure 2:
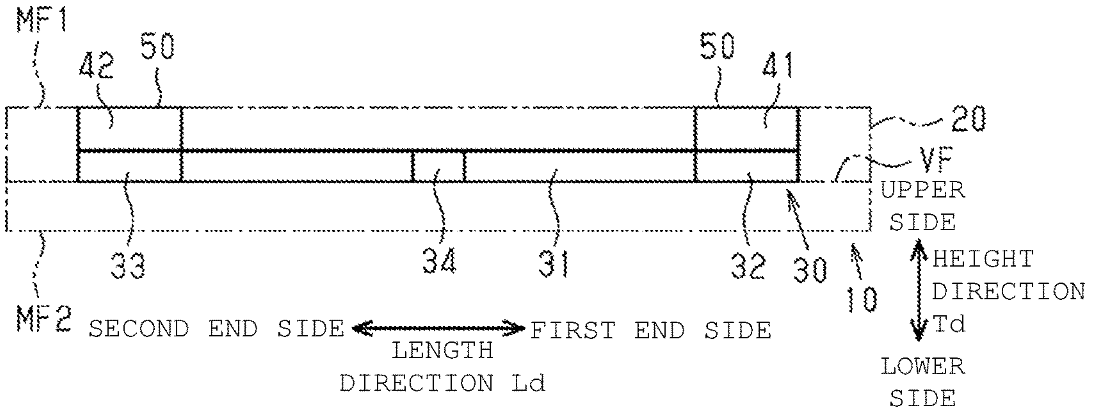
FIG. 2 is a cross-sectional view of the inductor component.

As shown in FIG. 2, an inductor wire 30 is disposed in the element body 20. The inductor wire 30 extends on a virtual flat plane VF that is a plane passing inside the element body 20. Further, a thickness of the inductor wire 30 in the height direction Td is approximately one quarter of a dimension of the element body 20 in the height direction Td. In the present embodiment, the inductor wire 30 extends parallel to both of a first main face MF1, which is an upper surface of the element body 20 in FIG. 2, and a second main face MF2, which is a lower surface of the element body 20 in FIG. 2. Therefore, the virtual flat plane VF is also parallel to both of the first main face MF1 and the second main face MF2. Further, the inductor wire 30 is disposed at a center of the element body 20 in the height direction Td. The inductor wire 30 is made of a conductive material. In the present embodiment, the inductor wire 30 has a composition in which a proportion of copper is more than or equal to 99 atomic % and a proportion of sulfur is more than or equal to 0.01 atomic % and less than 1.0 atomic (i.e., from % 0.01 atomic % to 1.0 atomic %) in the present embodiment.

Figure 3:
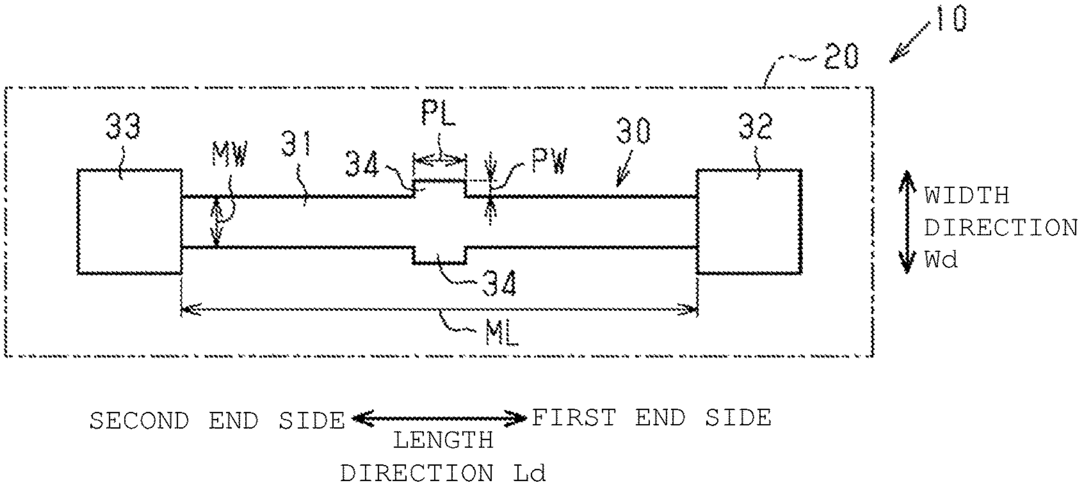
FIG. 3 is a top view of the inductor component.

As shown in FIG. 3, the inductor wire 30 is configured with a wire main body 31, a first pad 32, a second pad 33, and protrusions 34. The wire main body 31 of the inductor wire 30 has an oblong rectangular shape elongated in the length direction Ld in the top view. Since the wire main body 31 has an oblong rectangular shape as described above, a wire width MW, of the wire main body 31, parallel to the virtual flat plane and perpendicular to the extending direction of the wire main body 31 is constant.

With regard to the inductor wire 30, the first pad 32 is connected to a first end, of the wire main body 31, in the length direction Ld. The first pad 32 has a square shape in the top view. Further, a dimension of the first pad 32 in the width direction Wd is wider than the wire width MW of the wire main body 31. Note that the first pad 32 is a wiring part to connect the wire main body 31 to a first columnar wiring line 41 to be described later.

With regard to the inductor wire 30, the second pad 33 is connected to a second end, of the wire main body 31, in the length direction Ld. The second pad 33 has the same square shape as the first pad 32 in the top view. Further, a dimension of the second pad 33 in the width direction Wd is wider than the wire width MW of the wire main body 31. Note that the second pad 33 is a wiring part to connect the wire main body 31 to a second columnar wiring line 42 to be described later.

As shown in FIG. 2, the first columnar wiring line 41 of the same material as the inductor wire 30 is connected to an upper side of the first pad 32 in the height direction Td. The first columnar wiring line 41 has a square shape in the top view and has the same dimensions in the length direction Ld and the width direction Wd as the first pad 32. The first columnar wiring line 41 extends in the height direction Td to the first main face MF1 of the element body 20 and is exposed from the first main face MF1 of the element body 20. In other words, the first columnar wiring line 41 passes through inside the element body 20 in the height direction Td. Note that the above expression "passes through inside the element body 20 in the height direction Td" means that the first columnar wiring line 41 is not exposed in the length direction Ld or the width direction Wd of the element body 20.

The second columnar wiring line 42 of the same material as the inductor wire 30 is connected to an upper side of the second pad 33 in the height direction Td. The second columnar wiring line 42 has a square shape in the top view and has the same dimensions in the length direction Ld and the width direction Wd as the second pad 33. The second columnar wiring line 42 extends in the height direction Td to the first main face MF1 of the element body 20 and is exposed from the first main face MF1 of the element body 20. In other words, the second columnar wiring line 42 passes through inside the element body 20 in the height direction Td. Note that the above expression "passes through inside the element body 20 in the height direction Td" means that the second columnar wiring line 42 is not exposed in the length direction Ld or the width direction Wd of the element body 20.

As shown in FIG. 1, a part, of each of the first pad 32 and the second pad 33, exposed from the first main face MF1 of the element body 20 is covered with an outer terminal 50. Specifically, the outer terminals 50 are disposed on an upper side of the first main face MF1. The outer terminals 50 each have a three-layer structure in which copper, nickel, and gold are layered in order from each pad's side. As described above, the inductor component 10 includes the element body 20, the inductor wire 30, the first columnar wiring line 41, the second columnar wiring line 42, and the outer terminals 50. Note that in FIGS. 1 and 2, the outer terminals 50 are illustrated to have no thickness. Further, FIGS. 1 to 3 each illustrate a transparent view where the element body 20 is transparent.

Further, FIG. 3 does not show the first columnar wiring line 41, the second columnar wiring line 42, or the outer terminals 50.

As shown in FIG. 1, with regard to the inductor wire 30, each protrusion 34 having an oblong rectangular shape in the top view protrudes from one of the edges, of the wire main body 31, in the width direction Wd. Each protrusion 34 extends, from a center of the wire main body 31 in the extending direction of the wire main body 31, in a direction perpendicular to the extending direction. As shown in FIG. 2, the protrusions 34 extend on the virtual flat plane VF similarly to the wire main body 31. Further, in the present embodiment, as shown in FIG. 3, the protrusions 34 are each provided on one of the both sides, of the wire main body 31, in the width direction Wd with the extending direction of the wire main body 31 sandwiched between the protrusions 34.

As shown in FIG. 3, regarding dimensions of each protrusion 34, a dimension by which the protrusion 34 protrudes from the edge of the wire main body 31 in the width direction Wd is assumed as a protrusion width PW, and a dimension in a direction perpendicular to a direction in which the protrusion 34 protrudes is assumed as a protrusion length PL. The protrusion length PL is a dimension, in the extending direction, of a region in which the dimension in the width direction Wd is larger than the wire width MW in the wire main body 31 having the constant wire width MW in the extending direction. Further, the protrusion width PW is a dimension from the edge of the wire main body 31 to a protrusion tip of protrusion 34. The edge of the wire main body 31 is set by using the fact that the wire width MW, which is the dimension of the wire main body 31 in the width direction Wd, is constant. Specifically, a position that is away from the center, of the inductor wire 30, in the width direction Wd by the distance of "wire width MW/2" in the width direction can be deemed as the edge of the wire main body 31. The protrusion width PW and the protrusion length PL are measured in a viewing field in which the protrusion 34 and the wire main body 31 can be observed when a surface perpendicular to the height direction Td of the inductor wire 30 is subjected to cross-sectional observation. The cross-section to be observed in this observation is observed on a cross-section at the center in the height direction Td.

With regard to the inductor wire 30, a contact area between the wire main body 31 and the virtual flat plane VF can be calculated by multiplication of a wire length ML and the wire width MW of the wire main body 31. Further, a protrusion area PA of the protrusions 34 is calculated by adding an area of each protrusion 34, and the area of each protrusion 34 can be calculated by multiplication of the protrusion length PL and the protrusion width PW of the protrusion 34. Specifically, in the present embodiment, an area ratio RA, which is a ratio of the protrusion area PA of the protrusions 34 to the area of the wire main body 31, is 6.0%. That is, the area ratio RA is less than or equal to 7.2%.

Next, a method for manufacturing the above inductor component 10 will be described. The manufacturing method in the present embodiment is a method using Semi Additive Process (SAP). Note that, in the following description, the description will be given with reference to cross-sectional views perpendicular to the length direction Ld.

Figure 4:
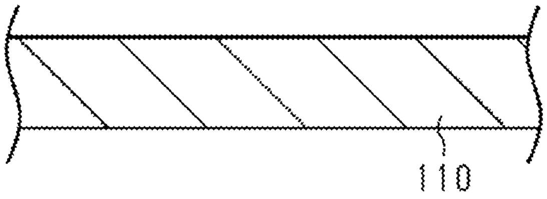
FIG. 4 is an explanatory diagram illustrating a method of manufacturing an inductor component.

As shown in FIG. 4, a base member preparation step is performed first.

Specifically, a plate-shaped base member 110 is prepared. A material of the base member 110 is ceramic. The base member 110 has a rectangular shape in the top view, and each side of the base member 110 has such a dimension to house a plurality of inductor components 10. In the following description, the description will be given assuming a direction perpendicular to a surface direction of the base member 110 as the vertical direction.

Figure 5:
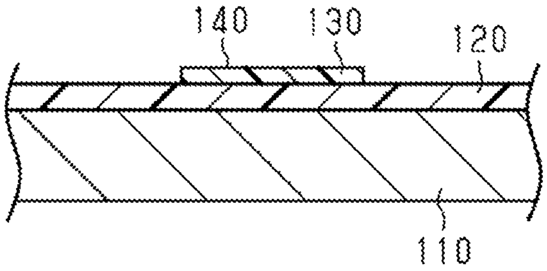
FIG. 5 is an explanatory diagram illustrating the method of manufacturing an inductor component.

Next, as shown in FIG. 5, a base resin layer 120 is applied to an entire upper surface of the base member 110. The base resin layer 120 is configured of a non-magnetic material and is formed, for example, by spin coating a surface of the base member 110 with polyimide varnish containing a trifluoromethyl group and silsesquioxane.

Figure 6:
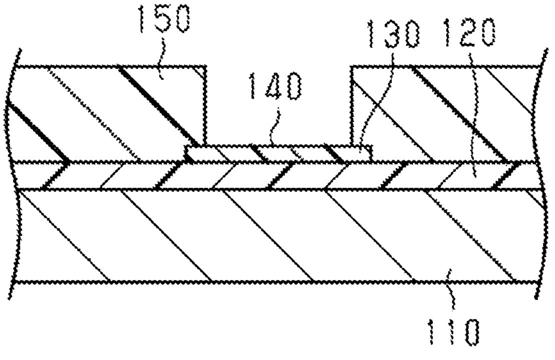
FIG. 6 is an explanatory diagram illustrating the method of manufacturing an inductor component.

Next, as shown in FIG. 6, a patterning resin layer 130 is formed on the base resin layer 120. Specifically, the patterning resin layer 130 is formed, in a region a little larger than a region on which the inductor wire 30 is disposed in the top view, by patterning a non-magnetic insulating resin by photolithography.

Next, a seed layer 140 is formed on the patterning resin layer 130 and on an upper surface of a part of the base resin layer 120 not covered with the patterning resin layer 130. Specifically, a seed layer 140 of copper is formed by sputtering from an upper surface side of the base member 110. Note that, in the drawing, the seed layer 140 is thinner than the other layers and is shown by a line.

Next, as shown in FIG. 6, a first covering part 150 is formed to cover a part of an upper surface of the seed layer 140 on which the inductor wire 30 is not formed Specifically, a photosensitive dry film resist is first applied to the entire upper surface of the seed layer 140. Next, the dry film resist is hardened by light-exposure on the entire upper surface of the base resin layer 120 and on a part of an upper surface, of the patterning resin layer 130, on an outer edge part of the patterning resin layer 130. In this step, a region in which the pattern is to be formed is set such that the area ratio RA of the protrusions 34 is less than or equal to 7.2%. After that, a not-hardened part of the applied dry film resist is removed with chemical liquid. By this process, a hardened part of the applied dry film resist constitutes the first covering part 150. On the other hand, the seed layer 140 is exposed on a part that is not covered with the applied first covering part 150 since the applied dry film resist is removed by chemical liquid.

Figure 7:
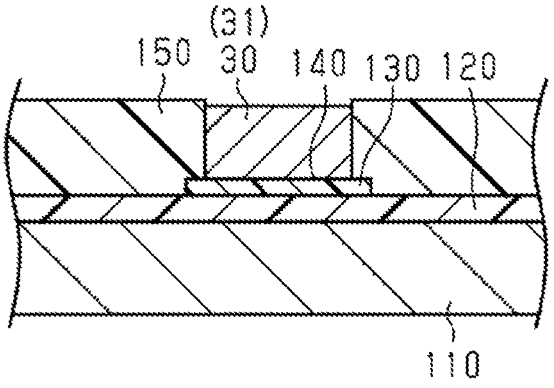
FIG. 7 is an explanatory diagram illustrating the method of manufacturing an inductor component.

Next, as shown in FIG. 7, the inductor wire 30 is formed by electrolytic plating on a part, of the upper surface of the patterning resin layer 130, not covered with the first covering part 150. Specifically, electrolytic copper plating is performed to plate copper on a part where the seed layer 140 is exposed on the upper surface of the patterning resin layer 130. This process forms the wire main body 31 of the inductor wire 30, the first pad 32, the second pad 33, and the protrusions 34. Note that FIG. 7 shows only the wire main body 31 of the inductor wire 30.

Next, the first columnar wiring line 41 and the second columnar wiring line 42 are respectively formed on the upper surfaces of the first pad 32 and the second pad 33. Specifically, by using photolithography, a second covering part covering a part where neither the first columnar wiring line 41 nor the second columnar wiring line 42 is formed is formed similarly to the first covering part 150. By this process, a hardened part of the applied dry film resist forms the second covering part. On the other hand, the upper surfaces of the first pad 32 and the second pad 33 are exposed on parts in which the dry film resist is removed by chemical liquid and which are not covered with the first covering part 150.

Figure 10:
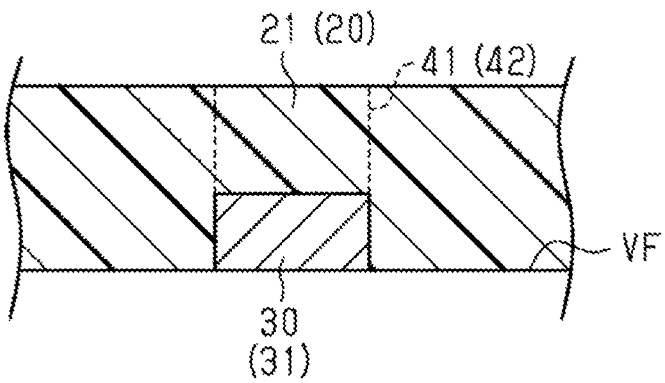
FIG. 10 is an explanatory diagram illustrating the method of manufacturing an inductor component.
Figure 11:
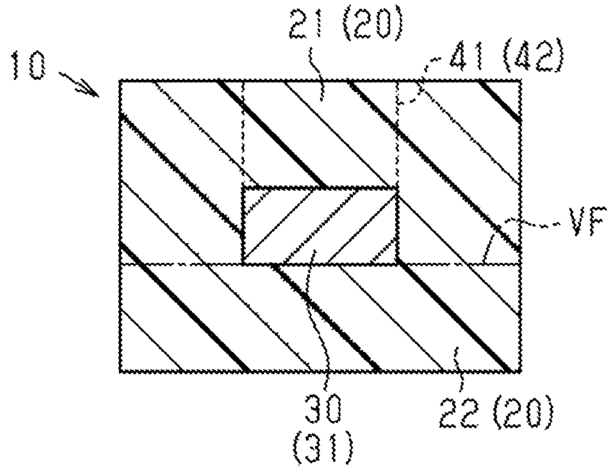
FIG. 11 is an explanatory diagram illustrating the method of manufacturing an inductor component.

Next, the first columnar wiring line 41 and the second columnar wiring line 42 are formed by electrolytic plating on the parts not covered with the second covering part. Specifically, electrolytic copper plating is performed to plate copper on the upper surfaces of the first pad 32 and the second pad 33. This process forms the first columnar wiring line 41 and the second columnar wiring line 42. Note that FIGS. 9 to 11 show the first columnar wiring line 41 and the second columnar wiring line 42 by broken lines.

Figure 8:
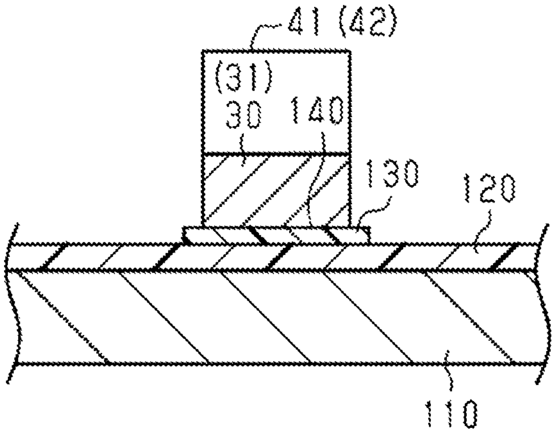
FIG. 8 is an explanatory diagram illustrating the method of manufacturing an inductor component.

Next, as shown in FIG. 8, the first covering part 150 and the second covering part are removed. Specifically, by performing a process using a stripper liquid, the first covering part 150 and the second covering part are swollen. Then, the first covering part 150 and the second covering part are separated and stripped from the base member 110 while parts of the first covering part 150 and the second covering part are physically pinched.

Next, a part of the seed layer 140 sticking out in a surrounding area of the inductor wire 30 is removed. Specifically, by performing etching on the seed layer 140, the part of the seed layer 140 exposed from the inductor wire 30 is removed.

Figure 9:
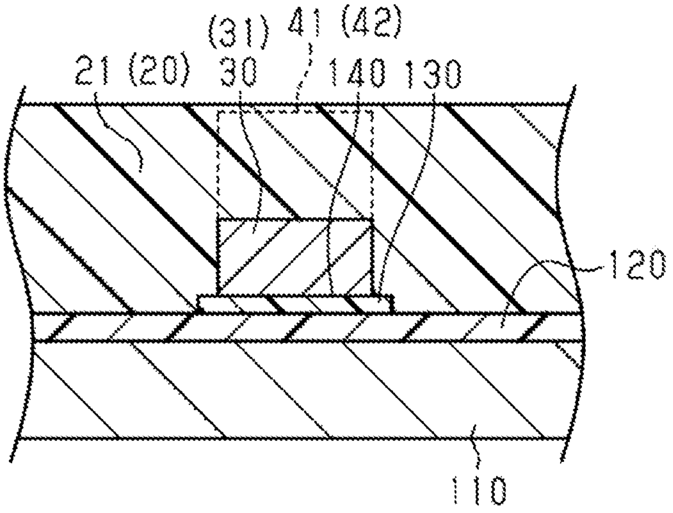
FIG. 9 is an explanatory diagram illustrating the method of manufacturing an inductor component.

Next, as shown in FIG. 9, a resin containing a magnetic powder, which is a material for a first magnetic layer 21, is applied on the upper surface side of the base member 110. In this step, the resin containing a magnetic powder is applied so as to cover also upper surfaces of the first columnar wiring line 41 and the second columnar wiring line 42. Next, the resin containing a magnetic powder is solidified by press machining, so that the first magnetic layer 21 is formed on the upper side of the base member 110. Next, an upper side part of the first magnetic layer 21 is ground off to such an extent that the upper surfaces of the first columnar wiring line 41 and the second columnar wiring line 42 are exposed.

Next, as shown in FIG. 10, the base member 110, the base resin layer 120, and the patterning resin layer 130 are removed. Specifically, grinding is performed in a planar manner until a lower surface of the inductor wire 30 is exposed, so that the base member 110, the base resin layer 120, and the patterning resin layer 130 are removed. Note that cut surfaces of the base member 110, the base resin layer 120, and the patterning resin layer 130 constitute the virtual flat plane VF, on which the inductor wire 30 extends.

Next, as shown in FIG. 11, a resin containing a metal magnetic powder, which is a material for a second magnetic layer 22, is applied to lower surfaces of the inductor wire 30 and the first magnetic layer 21. Next, the resin containing a magnetic powder is solidified by press machining, so that the second magnetic layer 22 is formed on a lower side of the inductor wire 30 and the first magnetic layer 21. Next, a lower side part of the second magnetic layer 22 is ground such that a dimension from an upper surface of the first magnetic layer 21 to a lower surface of the second magnetic layer 22, in other words, a thickness dimension of the element body 20 becomes a predetermined dimension.

Therefore, in the present embodiment, the virtual flat plane VF coincides with a boundary surface between the lower surface of the first magnetic layer 21 and an upper surface of the second magnetic layer 22.

After that, not shown in the drawings, but the outer terminals 50 are formed on upper surfaces of the first columnar wiring line 41 and the second columnar wiring line 42, which are exposed on the upper surface of the element body 20. The outer terminals 50 are formed by electroless copper plating of each of copper, nickel, and gold. By this process, the outer terminals 50 in a three-layer structure are formed.

Next, dicing is performed by cutting with a dicing machine in such a manner that a length dimension and a width dimension of the element bodies 20 are predetermined dimensions. By this process, a plurality of the above-mentioned inductor components 10 can be obtained.

Then, as shown in FIG. 12, comparison was conducted on inductance ratios and presence or absence of positional displacement of wire with respect to inductor components of a comparative example, inductor components 10 of the examples, and inductor components of referential examples.

The inductor components of the comparative example are different from the above-mentioned inductor components 10 only in that the inductor components of the comparative example do not have the protrusion 34 of the inductor wire 30. Further, between the inductor components 10 of the examples and the inductor components of the referential examples, the area ratio RA of the protrusions 34 to the wire main body 31 is different. Specifically, the areas of the protrusions 34 of the Examples 1 to 27 are less than or equal to 3,600 square micrometers, and the area ratios RA of the inductor components 10 of Examples 1 to 27 are less than or equal to 7.2%.

On the other hand, the area ratios RA of the inductor components of Referential examples 28 to 35 are greater than 7.2%. Note that, with regard to all the inductor components, the wire lengths ML are 500 μm, and the wire widths MW are 50 μm.

Further, with regard to each inductor component 10 of the examples and each inductor components of the referential examples, the protrusions 34 are each provided at the central position of the wire main body 31 in the extending direction and on one of the both sides of the wire main body 31 as in the above-mentioned embodiment. Further, each protrusion width PW shown in FIG. 12 is the sum of two protrusions 34.

In addition, the ratio of the protrusion width PW to the wire width MW was calculated as a protrusion width ratio, and the ratio of the protrusion length PL to the wire length ML was calculated as a protrusion length ratio. In the present embodiment, the area ratio RA can be calculated also by multiplication of the protrusion width ratio and the protrusion length ratio.

First, a predetermined number of the inductor components of the comparative example were manufactured, and it was found that a percentage of the inductor components in which the inductor wire main body 31 of the inductor wire 30 was displaced from a designed position to the number of the manufactured inductor components was more than 1%. On the other hand, for each of the inductor components 10 of the examples and the inductor components of the referential examples, a predetermined n number of inductor components 10 were manufactured, and it was found that the generation percentage of such positional displacement of wire was less than 1%. In more detail, the generation percentage of positional displacement of wire was more than 0.1% and less than or equal to 1% (i.e., from 0.1% to 1%) for Examples 1, 2, and 6. In contract, for Examples 3 to 5 and 7 to 27 and Referential examples 28 to 35, the generation percentage of positional displacement of wire was less than or equal to 0.1%. Note that, in FIG. 12, "E (Excellent)" represents the generation percentage of positional displacement of wire of less than or equal to 0.1%, "G (Good)" represents the generation percentage of positional displacement of wire of more than 0.1% and less than or equal to 1% (i.e., from 0.1% to 1%), and "NG (Not Good)" represents the generation percentage of positional displacement of wire of more than 1%.

Next, the inductance ratio is the ratio of the inductance of each example or each referential example to the inductance of the inductor components of the comparative example, in other words, the inductance in the case of no protrusion 34 provided. The calculation of the inductance was subjected to quantitative comparison by simulation. For the simulation, Femtet (registered trademark) of Murata Manufacturing Co., Ltd. was used. The material of the inductor wire 30 was copper, and magnetic material was MB3_23deg_JFE Ferrite, which was a low-loss power supply transformer material. The solver was an electromagnetic field analysis solver, and the frequency was 100 MHz.

Inductor components sometimes have a variation of approximately ±10% in inductance from a design value due to, for example, variation in manufacturing processes. Therefore, when a change in inductance compared to the inductor components of the comparative example is less than or equal to 3% in simulation, the protrusions 34 are not supposed to affect the inductance in terms of products.

As shown in FIG. 12, focusing on the relation between the area ratio RA and the inductance ratio, the inductance ratio is smaller as the area ratio RA is larger. With regard to the inductor components of Referential examples 30 to 35, the inductance ratios are less than or equal to 96%, and it is understood that the inductances were affected since the protrusions 34 were larger for the wire main bodies 31. Further, regarding the inductor components of Referential examples 28 and 29, the inductance ratios are 97%, and the area ratios RA are 8.0% and 8.4%. Here, the inductor components of Referential example 30, the area ratio RA is 8.0, and the inductance ratio is 97%. Therefore, an inductor component having an area ratio RA of 8.0% or 8.4% can have an inductance ratio of less than or equal to 96%. On the other hand, since the inductance ratio is more than or equal to 97% when the area ratio RA is less than or equal to 7.2%, it can be said that the effect of the protrusions 34 on the inductance is at such a level that the protrusions 34 do not cause a problem in manufacturing with regard to the inductor components 10 of Examples 1 to 27.

Further, focusing on the relation between the area ratio RA and the generation percentage of positional displacement of wire, the generation percentage of positional displacement of wire is lower as the area ratio RA is larger. With regard to Examples 1, 2 and 6, the area ratio RA is 0.4% or 0.8%, and the generation percentage of positional displacement of wire is "G". On the other hand, when the area ratio RA is more than or equal to 1.2%, the generation percentage of positional displacement of wire is "E".

Therefore, at least when the protrusions 34 are formed, the generation of positional displacement of wire can be reduced to less than 1.0%. Further, considering the inductance ratio and the generation percentage of positional displacement of wire with respect to the area ratio RA, when the area ratio RA is more than or equal to 1.2% and less than or equal to 7.2% (i.e., from 1.2% to 7.2%), the generation percentage of positional displacement of wire of the wire main body 31 can be less than 0.1%, and a decrease in inductance due to the protrusions 34 can be reduced to less than or equal to 3%.

Similarly, focusing on the relation between the protrusion area PA and the inductance ratio, the inductance ratio is generally smaller as the protrusion area PA is larger. With regard to the inductor components of Referential examples 30 to 35, the inductance ratios are less than or equal to 96%, and it is understood that the inductances were affected since the protrusions 34 were larger for the wire main bodies 31. Further, with regard to the inductor components of Referential examples 28 and 29, the inductance ratios are 97%, and the protrusion areas PA are 4,000 square micrometers and 4,200 square micrometers. Here, with regard to the inductor components of Referential example 30, the protrusion area PA is 4,000 square micrometers, and the inductance ratio is 97%. Therefore, an inductor component having a protrusion area PA of 4,000 square micrometers or 4,200 square micrometers can have an inductance ratio of less than or equal to 96%. On the other hand, since the inductance ratio is more than or equal to 97% when the protrusion area PA is less than or equal to 3,600 square micrometers, it can be said that the effect of the protrusions 34 on the inductance is at such a level that the protrusions 34 do not cause a problem in manufacturing with regard to the inductor components 10 of Examples 1 to 27.

Further, focusing on the relation between the protrusion area PA and the generation percentage of positional displacement of wire, the generation percentage of positional displacement of wire is lower as the protrusion area PA is larger. With regard to Examples 1, 2 and 6, the protrusion area PA is 100 square micrometers or 400 square micrometers, and the generation percentage of positional displacement of wire is "G". On the other hand, when the protrusion area PA is more than or equal to 600 square micrometers, the generation percentage of positional displacement of wire is "E".

Therefore, at least when the protrusion 34 is formed, the generation of positional displacement of wire can be reduced to less than 1%. Further, considering the inductance ratio and the generation percentage of positional displacement of wire with respect to the protrusion area PA, when the protrusion area PA is more than or equal to 600 square micrometers and less than or equal to 3,600 square micrometers (i.e., from 600 square micrometers to 3,600 square micrometers), the generation percentage of positional displacement of wire of the wire main body 31 can be less than 0.1%, and a decrease in inductance due to the protrusions 34 can be prevented or reduced.

Next, functions and effects of the above embodiment will be described.

(1) In the above embodiment, the first covering part 150 is removed in a manufacturing process of the inductor component 10. When the first covering part 150 is removed, a stripper liquid is used, so that the first covering part 150 is swollen with the stripper liquid. Therefore, the first covering part 150 has an expanding nature. As a result, a pressing force is applied to the inductor wire 30 from the first covering part 150. In particular, since the wire main body 31 is long, force is likely to be applied to the wire main body 31 in the width direction Wd. If there is a difference between pressing forces to the wire main body 31 from the right and left directions, a part of the wire main body 31 can be displaced from a designed position.

According to the above embodiment, the protrusions 34 are provided on the wire main body 31 to protrude in the width direction Wd. Therefore, an overall width dimension of the inductor wire 30 is larger at a part where the protrusions 34 are provided, and the area on which the inductor wire 30 is adhered to the patterning resin layer 130 is accordingly larger. Therefore, in particular, even if a force perpendicular to the extending direction of the wire main body 31, in other words, even if a force in the width direction Wd is applied, an occurrence of displacement of the wire main body 31 can be prevented or reduced.

(2) According to the above embodiment, the area ratio RA of the protrusion area PA of the protrusions 34 to the area of the wire main body 31 is within 7.2%. Since the sized of the protrusions 34 are not excessively large as described above, a decrease in an amount of the metal magnetic powder due to providing of the protrusions 34 can be a requisite minimum.

An amount by which the inductance is smaller than in the case where the protrusions 34 are not provided can be reduced.

(3) In the above embodiment, to the both ends of the wire main body 31 in the extending direction, there are connected the first pad 32 and the second pad 33, which have a larger dimension in the width direction Wd than the wire main body 31. Therefore, if a pressing force is applied to the inductor wire 30 from the above-mentioned first covering part 150, the position of the first pad 32 and the second pad 33 are hardly displaced. On the other hand, the pressing force from the first covering part 150 tends to intensively act on the center of the wire main body 31 in the extending direction, which center is most distant from the first pad 32 and the second pad 33 of the wire main body 31. According to the present embodiment, the protrusions 34 are disposed at the center of the wire main body 31 in the extending direction.

That is, in the present embodiment, the protrusions 34 are provided at a part where displacement is most likely to occur, so that displacement is effectively prevented or reduced.

(4) According to the above embodiment, the protrusions 34 extend on the both sides from the edges of the wire main body 31. Therefore, it is possible to secure the protrusion area PA of the whole protrusions 34 and, at the same time, to make the area of one protrusion 34 small. Therefore, it is possible to prevent or reduce interference to a surrounding area of the wire main body 31.

(5) According to the above embodiment, with regard to the composition of the inductor wire 30, the proportion of copper is more than or equal to 99 atomic %, and the proportion of sulfur is more than or equal to 0.01 atomic % and less than 1.0 atomic % (i.e., from 0.01 atomic % to less than 1.0 atomic %). Therefore, it is possible to form the inductor wire 30 by electroplating, and a wire that is thick and has low electric resistance can be obtained at low cost.

The above embodiment can be modified as below and be practiced. Each embodiment and the following modified examples can be combined and practiced without causing any technical contradiction.

In the above embodiment, the inductor wire 30 only has to be an element that can provide inductance to the inductor component 10 by generating magnetic flux in the magnetic layer when a current flows through the element.

In the above embodiment, the shape of the inductor wire 30 is not limited to the example in the embodiment.

Figure 13:
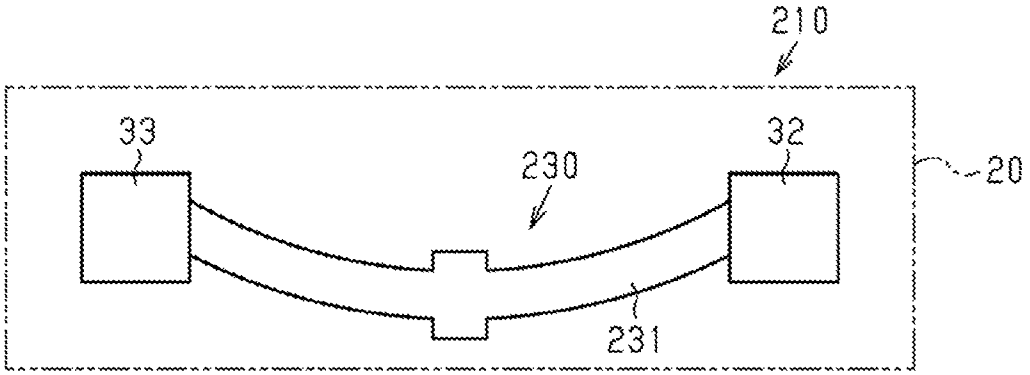
FIG. 13 is a top view of an inductor component of a modified example.
Figure 14:
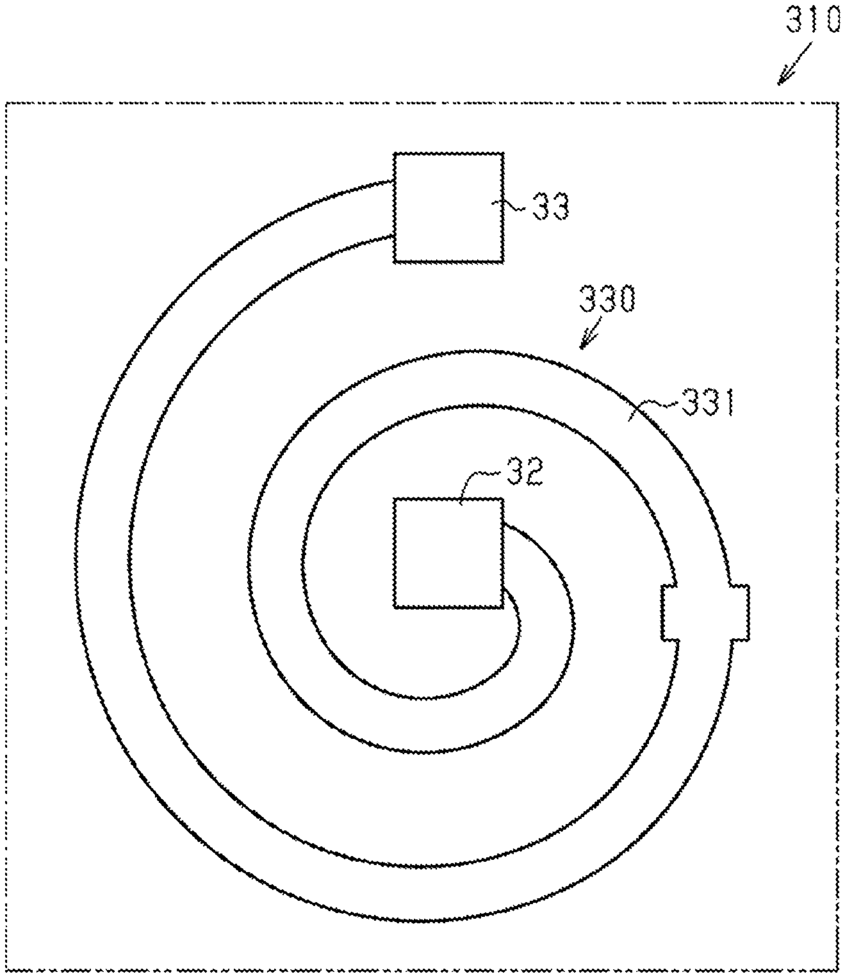
FIG. 14 is a top view of an inductor component of a modified example.

For example, in an example shown in FIG. 13, with regard to an inductor wire 230 of an inductor component 210, a wire main body 231 extends in a curved manner. Further, for example, in an example shown in FIG. 14, with regard to an inductor wire 330 of an inductor component 310, a wire main body 331 extends in a spiral manner. Still further, for example, the inductor wire 30 may have a meander shape. Also in the case where the wire main body 31 extends in a nonlinear manner as the modified examples, the dimension in the extending direction of the wire main body 31, in other words, the dimension in the direction perpendicular to the center line is the dimension of the width direction Wd of the wire main body 31. Note that, FIGS. 13 and 14 are top views of the inductor component, where the other members than the inductor wire are made transparent. Further, in a case where an inductor wire extends to be bent in a right angle, it is deemed that a first wire main body and a second wire main body are connected to each other and extending directions of the first wire main body and the second wire main body make a right angle. In this case, for example, in a case where wire widths of the first wire main body and the second wire main body are each constant, the protrusions only have to be provided on the wire main body having a constant width.

In the above embodiment, the material of the inductor wire 30 is not limited to the example in the above embodiment. The material of the inductor wire 30 only has to be a conductive material and may be silver, gold, nickel, aluminum, or the like.

In the above embodiment, a plurality of inductor wires 30 may be provided in the same layer. In this case, since the plurality of inductor wires 30 are provided, the plurality of inductor wires 30 can be put together in a single component. Further, when the plurality of inductor wires 30 are disposed in the same layer, it is possible to prevent or reduce an increase in an allover size in a lamination direction. In addition, because the inductor wires 30 are magnetically coupled to each other, it is possible to achieve characteristics appropriate for common mode choke coils, power inductors for multiphase, and the like. Further, an inductor component 10 in which a plurality of inductor wires 30 are provided in the same layer may be used while being separated into a plurality of inductor components. Further, for example, the plurality of inductor wires 30 may be stack in the height direction Td in the inductor component 10. In this case, it is possible to improve an inductance as a whole.

In the above embodiment, the shapes of the first pad 32 and the second pad 33 may be changed. For example, the shapes may be circular in the top view or a multangular shape other than a square.

In the above embodiment, the first columnar wiring line 41 does not have to be directly connected to the first pad 32. For example, if the inductor wire 30 is covered with an insulating resin, the first columnar wiring line 41 may be coupled via a via wire penetrating through the insulating resin. Alternatively, the first columnar wiring line 41 can be omitted. In this case, for example, a part of the first pad 32 is exposed on an outer face of the element body 20, and the outer terminals 50 may be provided on the exposed part.

In the above embodiment, the material of the element body 20 is not limited to the example in the above embodiment. For example, as the metal magnetic powder, it is possible to use iron, nickel, chromium, copper, aluminum, or an alloy containing these metals. Further, as the resin containing a metal magnetic powder, if insulation properties and formability are taken into consideration, polyimide resin, acrylic resin, and phenol resin are preferably used without being limited thereto, and epoxy resin or the like may be used. Note that in the case where the element body 20 is constituted by a resin containing a metal magnetic powder, the element body 20 preferably contains more than or equal to 60 wt % of the whole weight of the element body 20. Further, in order to increase filling properties of the resin containing a metal magnetic powder, it is preferable to make the resin contain two or three metal magnetic powders having different particle size distributions. Further, the material of the element body 20 may be composed of a resin containing a ferrite powder instead of a metal magnetic powder or may be composed of a resin containing both of a metal magnetic powder and a ferrite powder.

Further, for example, the element body 20 contain a resin in the above embodiment, but the element body 20 may be a sintered body of ferrite or may be a non-magnetic body.

In the above embodiment, the shape of the element body 20 is not limited to a rectangular parallelepiped shape and may be, for example, a circular column shape or a multangular shape.

In the above embodiment, the materials of the inductor wire 30, first columnar wiring line 41, and the second columnar wiring line 42 are not limited to the examples in the above embodiment. The materials of the inductor wire 30, the material of the first columnar wiring line 41 and the second columnar wiring line 42 may be different.

In the above embodiment, the material of the patterning resin layer 130 is polyimide resin, acrylic resin, epoxy resin, phenol resin, or the like, and the patterning resin layer 130 preferably contains fluorine or silicon. If the patterning resin layer 130 contains fluorine or silicon contained, it can improve an effect of prevention or reduction of signal loss at high frequencies. In particular, it is preferable that a content rate of fluorine or silicon be higher at a part of the patterning resin layer 130 closer to a surface on which the patterning resin layer 130 is in contact with the inductor wire 30. In addition, a higher content rate of silicon at the part close to the inductor wire 30 can increase adhesion between the patterning resin layer 130 and the inductor wire 30.

Further, fluorine atoms may be contained in the patterning resin layer 130 in a form of trifluoromethyl group, for example. Note that the trifluoromethyl group may be contained as a functional group in the resin or may be contained as an additive agent. Further, the fluorine-containing form other than the trifluoromethyl group may be, for example, difluoromethylene group, monofluoromethylene group, difluoromethyl group, monofluoromethyl group, pentafluoroethyl grope, trifluoroethyl grope, pentafluoropropyl group, hexafluoroisopropyl group, trifluorobutyl group, pentafluorobutyl group, heptafluorobutyl group, monofluorophenyl group, difluorophenyl group, trifluorophenyl group, tetrafluorophenyl group, or hexafluorophenyl group.

Further, silicon atoms may be contained in the patterning resin layer 130 in a form of silsesquioxane body, for example. Further, the silicon atom-containing form other than a silsesquioxane body may be silanol group, silica, or silicone, for example.

In the above embodiment, an insulating resin may be stacked on a lower side of the inductor wire 30. For example, the insulating resin can be made in the above-mentioned method for manufacturing the inductor component 10 by, instead of grinding until the lower surface of the inductor wire 30 is exposed, grinding in such a manner that a part of the patterning resin layer 130 on the inductor wire 30 side is left. In this case, the upper surface of the patterning resin layer 130 coincides with the virtual flat plane VF.

In the above embodiment, an entire surface of the inductor wire 30 may be coated with an insulating film such as polyimide. In this case, for example, a hole is formed in the insulating film on the upper side of each pad, and a via wire is formed inside each via hole. Then, the columnar wiring lines and the inductor wire 30 are connected via the via wires to secure conductivity.

In the above embodiment, a structure of the outer terminals 50 are not limited to the example in the above embodiment. For example, the outer terminals 50 may be configured of only copper. Alternatively, the outer terminals 50 may be omitted.

In the above embodiment, the virtual flat plane VF does not have to be parallel to the first main face MF1 or the second main face MF2. For example, the virtual flat plane VF may be parallel to an external surface, of the element body 20, different from the first main face MF1 and the second main face MF2, or may not be parallel to any outer face of the element body 20.

The inductor component 10 may be manufactured by another manufacturing method not using a semi-additive method. For example, the inductor component 10 may be manufactured by using a seed lamination method, a printing lamination method, or another method, and the inductor wire 30 may be formed by a thin film method such as a sputtering method or a deposition method, a thick film method such as a printing method or a coating method, or a plating process such as a full additive method or a subtractive method.

Also in these methods, the inductor wire 30 sometimes receives a pressing force from a member located in a surrounding area of the inductor wire 30 during a manufacturing process or after being manufactured. In this case, since the inductor wire 30 includes the protrusions 34, an adhesion force to the virtual flat plane VF on which the inductor wire 30 extends is accordingly larger. Therefore, in the inductor component 10, regardless of manufacturing methods, it is possible to prevent or reduce displace of the inductor wire 30 from a designed position inside the element body 20.

In the above embodiment, the shape of the protrusion 34 of the inductor wire 30 is not limited to the example in the above embodiment. For example, the shape may be a multangular shape or a semicircular shape. In these cases, it is possible to calculate the area ratio RA of the protrusion area PA of the protrusions 34 to the area of the wire main body 31 by calculating the protrusion area PA of the protrusions 34, depending on the shape of the protrusion 34. The area ratio RA in such cases only has to be within 7.2%.

In the above embodiment, the number of the protrusions 34 of the inductor wire 30 is not limited to the example in the above embodiment. For example, only one protrusion 34 may be provided on one side of the wire main body 31 in the width direction Wd. In the case where the protrusion 34 is provided only on one side, when the protrusion 34 is made to extend on a side more distant from other wires in a surrounding area of wire main body 31, interference with the other wires can be prevented or reduced. Further, the number of the protrusions 34 of the inductor wire 30 may three or more; however, if the number is excessively large, the wire width MW of the wire main body 31 is not constant, the inductance can be accordingly low. By the way, when a plurality of protrusions 34 are provided, a total area is calculated as the protrusion area PA by adding the areas of the plurality of protrusions 34. The protrusion area PA, which is the total area of the plurality of protrusions 34, only has to be less than or equal to 3,600 square micrometers. Further, the area ratio RA is calculated as the ratio of the area of the protrusion area PA, which is the total area of the plurality of protrusions 34, to the wire main body 31; and the area ratio RA only has to be within 7.2%.

Figure 15:
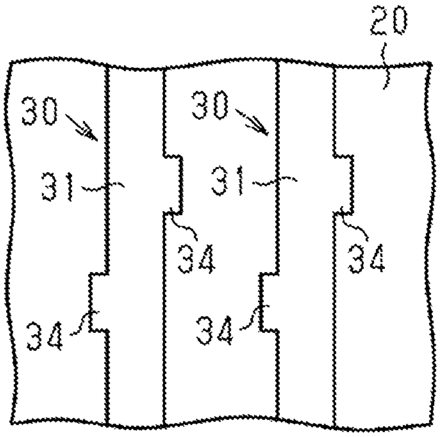
FIG. 15 is a top view showing a part of an inductor component of a modified example.

In the above embodiment, the positions of the protrusions 34 of the inductor wire 30 may be shifted from the center of the wire main body 31 in the extending direction. Further, for example, as shown in FIG. 15, when a plurality of inductor wires 30 are disposed inside the element body 20, the protrusion 34 on one side of each wire main body 31 may be shifted, in position in the extending direction, from the protrusion 34 on the other side of the wire main body 31.

In this case, it is possible to prevent the protrusion 34 from being in contact with the protrusion 34 of the adjacent inductor wire 30.

In the above embodiment, when the area ratio RA of the protrusion area PA of the protrusions 34 to the area of the wire main body 31 is more than or equal to 1.2%, the generation percentage of positional displacement of wire of the wire main body 31 can be prevented or reduced. Therefore, in a case where a reduction in the inductance is acceptable to a certain extent, the area ratio RA of more than or equal to 1.2% is preferable in terms of preventing or reducing positional displacement of the wire main body 31 even if the area ratio RA is greater than 7.2%.

In the above embodiment, the dimensions of the protrusions 34 are observed on a cross-section located at the center in the height direction Td; however, the cross-section on which the dimensions of the protrusions 34 are measured does not have to be at the center in the height direction Td. For example, the cross-section may be displaced by a small amount from the center in the height direction Td due to errors or the like of a device. When the measurement is performed at a position close to an upper surface or a lower surface of the protrusion 34, the dimensions of the protrusion 34 can be varied; therefore, such variation can be reduced by measuring the dimensions of the protrusions 34 at the center in the height direction Td as much as possible.

The technical idea that can be grasped from the above embodiment and modified examples will be described.

An inductor component includes: an element body containing a magnetic material; and an inductor wire disposed in the element body. The wire main body of the inductor wire extends on a predetermined plane; and a wire width is constant, where the wire width is a dimension of the wire main body in a width direction parallel to the predetermined plane and perpendicular to an extending direction of the wire main body. A protrusion extends, on the plane, from the wire main body. An area ratio of the protrusion to the wire main body is more than or equal to 1.2% as viewed from a direction perpendicular to the plane.

With the above configuration, the protrusion is provided on the wire main body; therefore, a contact area, on the predetermined plane, between the inductor wire and the element body is accordingly larger. Therefore, the inductor wire can be strongly in close contact with the other part, so that it is possible to prevent or reduce displacement of the wire main body from a designed position.

What is claimed is:

1. An inductor component comprising:

an element body containing a magnetic material; and an inductor wire disposed in the element body, the inductor wire including:

a wire main body extending on a predetermined plane, the wire main body being parallel to the predetermined plane and having a dimension that is constant in a width direction perpendicular to an extending direction in which the wire main body extends;

a pad via which the wire main body is to be connected to another wire; and at least one protrusion protruding, from the wire main body, on the predetermined plane, the protrusion protruding from an edge of the wire main body in the width direction, and an area ratio of the protrusion to the wire main body as viewed from a direction perpendicular to the predetermined plane being less than or equal to 7.2%, wherein the dimension is constant between the pad and the protrusion in the width direction perpendicular to the extending direction in which the wire main body extends.

2. The inductor component according to claim 1, wherein the protrusion is located at a center of the wire main body in the extending direction thereof.

3. The inductor component according to claim 1, wherein the at least one protrusion includes a plurality of protrusions, provided on each of both sides of the wire main body in the width direction thereof.

4. The inductor component according to claim 1, wherein the protrusion is provided on one side of the wire main body in the width direction thereof.

5. The inductor component according to claim 1, wherein the inductor wire has a composition in which a proportion of copper is more than or equal to 99 atomic % and a proportion of sulfur is from 0.01 atomic % to less than 1.0 atomic %.

6. The inductor component according to claim 1, wherein an area ratio of the protrusion to the wire main body is more than or equal to 1.2% as viewed from a direction perpendicular to the predetermined plane.

7. The inductor component according to claim 2, wherein the at least one protrusion includes a plurality of protrusions, provided on each of both sides of the wire main body in the width direction thereof with the extending direction sandwiched between the both sides.

8. The inductor component according to claim 2, wherein the protrusion is provided on one side of the wire main body in the width direction thereof.

9. The inductor component according to claim 2, wherein the inductor wire has a composition in which a proportion of copper is more than or equal to 99 atomic % and a proportion of sulfur is from 0.01 atomic % to less than 1.0 atomic %.

10. The inductor component according to claim 3, wherein the inductor wire has a composition in which a proportion of copper is more than or equal to 99 atomic % and a proportion of sulfur is from 0.01 atomic % to less than 1.0 atomic %.

11. The inductor component according to claim 4, wherein the inductor wire has a composition in which a proportion of copper is more than or equal to 99 atomic % and a proportion of sulfur is from 0.01 atomic % to less than 1.0 atomic %.

12. The inductor component according to claim 7, wherein the inductor wire has a composition in which a proportion of copper is more than or equal to 99 atomic % and a proportion of sulfur is from 0.01 atomic % to less than 1.0 atomic %.

13. The inductor component according to claim 8, wherein the inductor wire has a composition in which a proportion of copper is more than or equal to 99 atomic % and a proportion of sulfur is from 0.01 atomic % to less than 1.0 atomic %.

14. The inductor component according to claim 2, wherein an area ratio of the protrusion to the wire main body is more than or equal to 1.2% as viewed from a direction perpendicular to the predetermined plane.

15. The inductor component according to claim 3, wherein an area ratio of the protrusion to the wire main body is more than or equal to 1.2% as viewed from a direction perpendicular to the predetermined plane.

16. The inductor component according to claim 4, wherein an area ratio of the protrusion to the wire main body is more than or equal to 1.2% as viewed from a direction perpendicular to the predetermined plane.

17. The inductor component according to claim 5, wherein an area ratio of the protrusion to the wire main body is more than or equal to 1.2% as viewed from a direction perpendicular to the predetermined plane.

18. An inductor component comprising:

an element body containing a magnetic material; and an inductor wire disposed in the element body, the inductor wire including:

a wire main body extending on a predetermined plane, the wire main body being parallel to the predetermined plane and having a dimension that is constant in a width direction perpendicular to an extending direction in which the wire main body extends;

a pad via which the wire main body is to be connected to another wire; and a protrusion protruding, from the wire main body, on the predetermined plane, the protrusion protruding from an edge of the wire main body in the width direction thereof, and an area of the protrusion to the wire main body as viewed from a direction perpendicular to the predetermined plane being less than or equal to 3,600 square micrometers, wherein the dimension is constant between the pad and the protrusion in the width direction perpendicular to the extending direction in which the wire main body extends.

19. The inductor component according to claim 1, wherein the pad comprises:

a first pad via which the wire main body is to be connected to another wire; and a second pad to which the wire main body is to be connected, wherein the dimension of the wire main body is constant in the width direction between the first pad and the second pad.

* * * * *